(12) United States Patent
Rajasekaran et al.

(10) Patent No.: US 11,330,791 B2
(45) Date of Patent: May 17, 2022

(54) TEATCUP LINER AND A TEATCUP

(71) Applicant: DELAVAL HOLDING AB, Tumba (SE)

(72) Inventors: Kamlesh Rajasekaran, Tumba (SE); Nils Älveby, Tumba (SE)

(73) Assignee: DeLaval Holding AB, Tumba (SE)

( * ) Notice: Subject to any disclaimer, the term of this patent is extended or adjusted under 35 U.S.C. 154(b) by 40 days.

(21) Appl. No.: 16/762,528

(22) PCT Filed: Nov. 6, 2018

(86) PCT No.: PCT/SE2018/051137
§ 371 (c)(1),
(2) Date: May 8, 2020

(87) PCT Pub. No.: WO2019/093951
PCT Pub. Date: May 16, 2019

(65) Prior Publication Data
US 2021/0185973 A1 Jun. 24, 2021

(30) Foreign Application Priority Data
Nov. 9, 2017 (SE) .................... 1751386-2

(51) Int. Cl.
*A01J 5/00* (2006.01)
*A01J 5/08* (2006.01)
(52) U.S. Cl.
CPC ...................... *A01J 5/08* (2013.01)
(58) Field of Classification Search
CPC ........ A01J 5/06; A01J 5/10; A01J 5/16; A01J 5/12; A01J 5/04
See application file for complete search history.

(56) References Cited

U.S. PATENT DOCUMENTS 5,493,995 A   2/1996  Chowdhury
6,776,120 B1 * 8/2004  Chowdhury ............. A01J 5/04
                                                119/14.46
(Continued)

FOREIGN PATENT DOCUMENTS

DE       4419948 C1   6/1995
EP       2846625 B1   2/2017
(Continued)

OTHER PUBLICATIONS

International Search Report and Written Opinion, dated Feb. 5, 2019, from corresponding PCT application No. PCT/SE2018/051137.

(Continued)

*Primary Examiner* — Joshua J Michener
*Assistant Examiner* — Henry Hooper Mudd
(74) *Attorney, Agent, or Firm* — Nixon & Vanderhye

(57) ABSTRACT

A teatcup to be attached to the teat of an animal and a teatcup liner (1) for mounting in a shell (2) of the teatcup, where the teatcup liner includes a barrel (3) enclosing an inner space (7) for receiving the teat. The barrel includes a lower section (3') and an upper section (3") adjoining the lower section. The barrel has a polygonal cross-sectional shape, defining a plurality of side portions (18) and a plurality of corner portions (19), each connecting two of the side portions. Each side portion has a side wall thickness at a center line of the side portion. Each corner portion has a corner wall thickness at a center line of the corner portion. The corner wall thickness is thicker than the side wall thickness along the barrel. The corner wall thickness decreases along the upper section of the barrel towards the lower section.

19 Claims, 3 Drawing Sheets

(56) References Cited

U.S. PATENT DOCUMENTS

| 8,567,346 | B1 | 10/2013 | Aelveby | |
|---|---|---|---|---|
| 2004/0050334 | A1 | 3/2004 | Miller | |
| 2008/0072825 | A1* | 3/2008 | Petersson | A01J 5/06 |
| | | | | 119/14.47 |
| 2011/0126867 | A1* | 6/2011 | Grace | A01J 5/16 |
| | | | | 119/14.47 |
| 2015/0075434 | A1* | 3/2015 | Lidmar | A01J 5/00 |

FOREIGN PATENT DOCUMENTS

| GB | 331297 A | 7/1930 |
|---|---|---|
| WO | 2017/105321 A1 | 6/2017 |

OTHER PUBLICATIONS

SE Search Report, dated May 30, 2018, from corresponding SE application No. 1751386-2.

\* cited by examiner

Fig 1
Fig 2
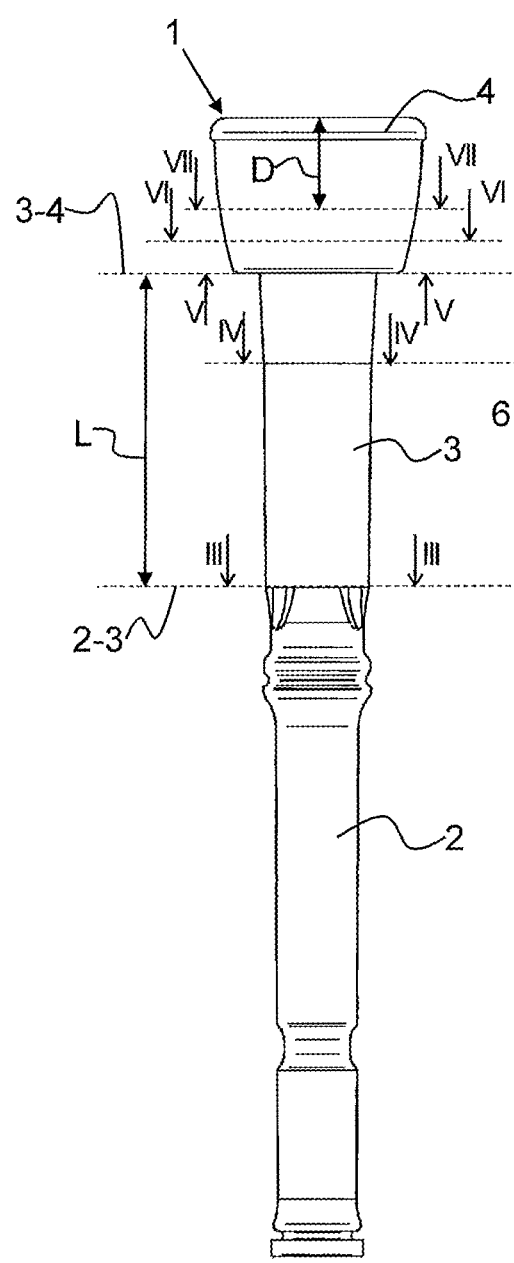
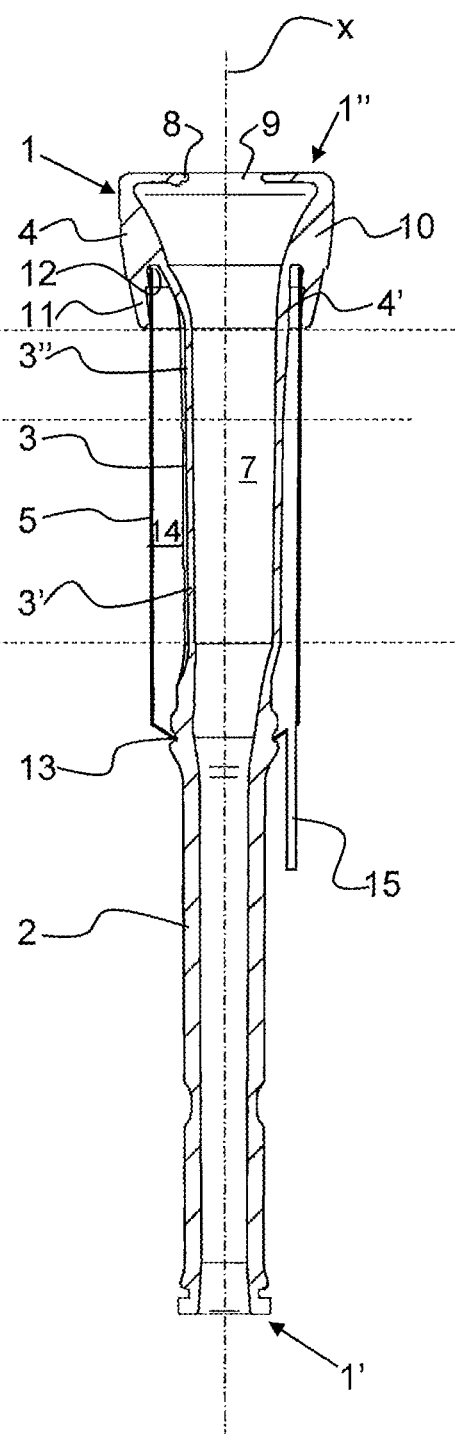

TEATCUP LINER AND A TEATCUP

TECHNICAL FIELD OF THE INVENTION

The present invention refers to a teatcup liner configured to be mounted in a shell of a teatcup to be attached to the teat of an animal to be milked according to the preamble of claim 1. The invention also refers to a teatcup configured to be attached to the teat of an animal.

BACKGROUND AND PRIOR ART

EP 2 846 625 discloses a teatcup liner configured to be mounted in a shell of a teatcup to be attached to the teat of an animal to be milked, and having an elongated shape extending along a longitudinal axis. The teatcup liner comprises a barrel having a length along the longitudinal axis and defining an inner space for receiving the teat. The barrel has, in a rest state, a polygonal cross-sectional shape transversely to the longitudinal axis.

The polygonal cross-sectional shape of the barrel defines a plurality of corner portions and a plurality of side portions, each connecting two of the corner portions. Each of the side portions has a first wall thickness at least at a centre line of the side portion along the length of the barrel. Each of the corner portions has a second wall thickness at least at a centre line of the corner portion along the length of the barrel. The first wall thickness is smaller than the second wall thickness.

The polygonal cross-sectional shape of the barrel is advantageous in comparison to a circular cross-sectional shape in that it provides a gentle treatment of the teat during the milking operation and at the same time an efficient massaging of the teat. The thinner wall thickness of the side portions facilitates complete collapsing of the barrel by enabling the inward movement of the side portions towards the longitudinal central axis.

WO 2017/105321 discloses a teatcup liner including a head defining a mouthpiece, a barrel with an upper barrel joined to a lower barrel, an outlet portion that extends downward from the lower barrel co-operates with the shell of the teat cup. In a relaxed state, the barrel has a polygonal cross-sectional shape, with the lower barrel having a flexibility for closing during the liner collapse phase of the milking operation greater than a flexibility of the upper barrel such that corner portions of the lower barrel are weaker than the corner portions of the upper barrel thereby assuring the lower barrel collapses first to create an upward wave movement of the lower barrel towards the upper barrel that securely collapses the upper barrel onto the teat to provide an enhanced teat massage and relieve congestion in the teat tissue.

SUMMARY OF THE INVENTION

The object of the present invention is to provide a teatcup liner, having a polygonal cross-sectional shape, with an improved behavior, especially an improved collapsing behavior and an improved contact with the teat and the barrel.

This objet is achieved by the teatcup liner initially defined, which is characterized in that the corner wall thickness decreases along the upper section towards the lower section of the barrel.

The decreasing thickness of the corner portions may result in an improved control of the collapsing behavior of the barrel. At the lower section of the barrel, the corner portions may obtain a more hinge-like function and thus a perfectly symmetric collapsing of the barrel may be achieved. This in turn may secure a complete collapsing and closure of the barrel at the lower section, i.e. beneath the teat.

At the upper section, the thicker but decreasing corner wall thickness may permit the teat to fill up the inner space of the barrel during the whole pulsating cycles of the milking operation and may thus ensure a tight contact with the barrel around the teat at least at one cross section. Thus, leakage of air or gas between the barrel and the teat may be reduced or substantially prevented.

According to an embodiment of the invention, the corner wall thickness approaches the side wall thickness towards the lower section of the barrel. The decrease of the corner wall thickness may be continuous along the length of the upper section. The corner wall thickness may approach the side wall thickness but remain thicker, or somewhat thicker, than the side wall thickness at a lower end of the upper section.

According to an embodiment of the invention, the upper section of the barrel extend along at most 40% of the length of the barrel, along at most 35% of the length of the barrel, along at most 30% of the length of the barrel, or along at most 25% of the length of the barrel. Advantageously, the upper section of the barrel extends along at least 10% of the length of the barrel, along at least 15% of the length of the barrel, or along at least 20% of the length of the barrel.

As mentioned above, the upper section is configured to ensure a tight contact between the teat and the barrel, and the lower section is configured to ensure a complete collapsing of the barrel. The shorter length of the upper section in relation to the lower section renders the functioning of the barrel independent, or essentially independent, of the length of the teat. The tight contact of the barrel to the teat needs only to be achieved at a very short axial length, theoretically only at one cross-sectional plane perpendicular to the longitudinal central axis.

According to an embodiment of the invention, the corner wall thickness may decrease from an upper border of the upper section to the lower section. Thus, the corner wall thickness may be largest at the upper border of the upper section.

According to an embodiment of the invention, the corner wall thickness is constant, or substantially constant, along the lower section of the barrel. The corner wall thickness along the whole lower section may be configured to permit a complete collapsing of the barrel beneath the teat.

According to an embodiment of the invention, the side wall thickness is constant, or substantially constant, along the upper section and the lower section of the barrel.

According to an embodiment of the invention, the lower section of the barrel extends along at least 60% of the length of the barrel, along at least 65% of the length of the barrel, along at least 70% of the length of the barrel, or along at least 75% of the length of the barrel. Advantageously, the lower section of the barrel extends along at most 90% of the length of the barrel, along at most 85% of the length of the barrel, or along at most 80% of the length of the barrel.

According to an embodiment of the invention, each of the side portions has in the rest state a convex curvature towards the inner space and the longitudinal central axis along the length of the barrel. Such an inwardly directed curvature or bulging contributes to a uniform collapsing of barrel, and may ensure that all side portions of the barrel collapse properly. Each of the side portions may thus have a radius extending from a position outside the inner space to an outer surface of the side portion at the longitudinal centre line of the side portion.

According to an embodiment of the invention, each of the corner portions comprises in the rest state an inner surface facing the inner space and having a concave curvature towards the inner space with an inner radius, which extends from the inner space to the inner surface and is in the rest state at least 4 mm at the longitudinal centre line of the corner portion.

According to an embodiment of the invention, the inner radius of each of the corner portions decreases from the upper section towards a lower end of the teatcup liner.

According to an embodiment of the invention, the length of the barrel lies in the interval 90-130 mm.

According to an embodiment of the invention, the teatcup liner comprises an outlet portion adjoining the lower section of the barrel, and a mouthpiece portion comprising a lip defining a teat opening to the inner space.

According to an embodiment of the invention, the length of the barrel extends from a lower border between the outlet portion and the barrel to an upper border between the barrel and the mouthpiece portion. Thus, the upper section extends from the upper border to the lower section, whereas the lower section extends from the upper section to the lower border.

According to an embodiment of the invention, the inner radius of each of the corner portions decreases from the upper border to the lower border.

According to an embodiment of the invention, the mouthpiece portion is an integrated part of the teatcup liner. According to another embodiment of the invention, the mouthpiece portion is a separate part attached to the barrel to form the teatcup liner.

According to an embodiment of the invention, the outlet portion forms a short milk conduit. According to another embodiment of the invention, the outlet portion comprises an outlet member, such as a nipple, configured to permit connection of the outlet portion to a separate milk conduit.

According to an embodiment of the invention, the mouthpiece portion comprises a transition section adjoining the upper section of the barrel.

According to an embodiment of the invention, the transition section has a length along the longitudinal central axis, which lies in the interval 15-20 mm.

According to an embodiment of the invention, the mouthpiece portion has a mouthpiece depth along the longitudinal central axis from the transition section to the teat opening, wherein the mouthpiece depth lies in the interval 20-30 mm.

According to an embodiment of the invention, the outlet portion has engagement means configured for engagement with the shell.

According to an embodiment of the invention, the polygonal cross-sectional shape is a triangular cross-sectional shape defining three side portions and three corner portions.

According to an embodiment of the invention, the polygonal cross-sectional shape is a rectangular, or square, cross-sectional shape defining four side portions and four corner portions.

The object is also achieved by the teatcup initially defined comprising a shell and a teatcup liner as defined above.

BRIEF DESCRIPTION OF THE DRAWINGS

The present invention is now to be explained more closely through a description of various embodiments and with reference to the drawings attached hereto.

FIG. 1 discloses a longitudinal side view of a first embodiment of a teatcup liner according to the invention.

FIG. 2 discloses a longitudinal sectional view of a shell and the teatcup liner in FIG. 1.

DETAILED DESCRIPTION OF VARIOUS EMBODIMENTS

Figure 3:
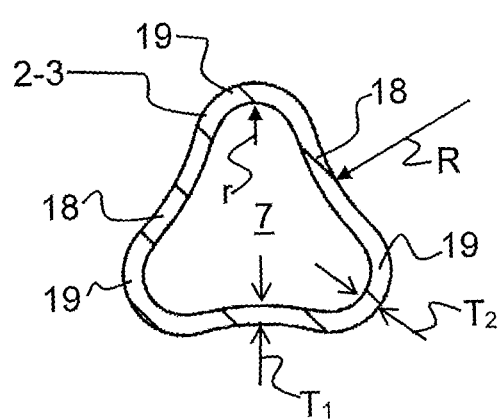
FIG. 3 discloses a sectional view of the teatcup liner along the line III-Ill in FIG. 1.

FIGS. 1 to 7 disclose a teatcup liner 1 according to a first embodiment of the invention. The teatcup liner 1 comprises an outlet portion 2, a barrel 3 and a mouthpiece portion 4. As can be seen in FIG. 2, the teatcup liner 1 is configured to be mounted in a shell 5 of a teatcup, i.e. the teacup liner 1 and the shell 5 may form the teatcup, to be applied to the teat of an animal.

The teatcup liner 1 has an elongated shape and extends along a longitudinal central axis x. The outlet portion 2, the barrel 3 and the mouthpiece portion 4 are provided subsequently after each other along the longitudinal central axis x.

In the first embodiment, the outlet portion 2, the barrel 3 and the mouthpiece portion 4 are manufactured in one piece of one elastomeric material, such as natural or synthetic rubber, silicon, or thermo-plastic elastomers, etc. It is to be noted that the outlet portion 2 and/or the mouthpiece portion 4 may be manufactured in another, possibly less elastomeric material than the barrel 2.

Thus in the first embodiment, the mouthpiece portion 4 is or forms an integrated part of the teatcup liner 1. According to another embodiment, the mouthpiece portion 4 may be a separate part attached to the barrel 3 to form the teatcup liner 1, see FIG. 9.

The outlet portion 2 and the barrel 3 are adjoining each other along a lower border 2-3. The barrel 3 and the mouthpiece portion 4 are adjoining each other along an upper border 3-4. The lower border 2-3 and the upper border 3-4, which are disclosed in FIGS. 1 and 2 by respective dashed lines, extend perpendicularly to the longitudinal central axis x.

The barrel 3 comprises, or consists of, a lower section 3' and an upper section 3" along the longitudinal central axis x. The lower section 3' adjoins the upper section 3" at a transition 6. The transition 6, which is disclosed in FIG. 1 by a dashed line, extends perpendicularly to the longitudinal central axis x.

The barrel 3 has a length L along the longitudinal central axis x between the lower border 2-3 and the upper border 3-4. The length L of the barrel 3 lies in the interval 90-130 mm, preferably in the interval 100-120 mm.

The barrel 3 encloses an inner space 7 for receiving the teat.

The outlet portion 2 forms a lower end 1' of the teatcup liner 1. The mouthpiece portion 4 forms an upper end 1" of the teatcup liner 1. Throughout the application, the word "upper" indicates a position closer to the udder of the animal during the milking when the teatcup is attached to the teat of an animal in comparison to the word "lower" that indicates a position more remote from the udder during the milking of the animal.

The mouthpiece portion 4 comprises a transition section 4' adjoining the barrel 3 at the upper border 3-4. Furthermore, the mouthpiece portion 4 comprises a lip 8 forming a teat opening 9 for the teat to the inner space 7.

The mouthpiece portion 4 comprises an annular base 10. The lip 8 extends from the annular base 10 towards the longitudinal central axis x. The transition section 4' extends along the longitudinal central axis x from the annular base 10 to a lower end of the mouthpiece portion 4, i.e. to the upper border 3-4.

The mouthpiece portion 4 also comprises a collar 11 which extends from the annular base 10 towards the outlet portion 2. The collar 11 extends outside and around the transition section 4'. The collar 11 forms an annular recess 12 for receiving an upper end of the shell 5. The annular recess 12 is thus provided between the collar 11 and the transition section 4'.

The transition section 4', which adjoins the upper section 3" of the barrel 3, has a length along the longitudinal central axis x which may lie in the interval 15-20 mm. The mouthpiece portion 4 has a mouthpiece depth D along the longitudinal central axis x from the teat opening 9 to the transition section 4'. The mouthpiece depth D may lie in the interval 20-30 mm.

The outlet portion 2 extends from the lower end 1' of the teatcup liner 1 to the barrel 3. In the first embodiment, the outlet portion 2 comprises a short milk conduit extending to the lower end 1' of the teatcup liner 1, and being configured to be attached to a claw or any other similar milk-receiving member (not disclosed).

The outlet portion 2 also comprises engagement means 13, such as a shoulder, a groove or a recess, for engaging a lower end of the shell 5 when the teatcup liner 1 is mounted in the shell 5 to form the teatcup.

A pulsation chamber 14 is formed between the shell 5 and the teatcup liner 1, especially between the shell 5 and the barrel 3. A pulse nipple 15 may be provided for supplying a pulsating vacuum or pulsating pressure to the pulsation chamber 14.

The upper border 3-4 may be located at a position where the barrel 3 is in contact with the surface of the teat around the teat. For instance, the average diameter of the inner space 7 at the upper border 3-4 may lie in the interval 23-28 mm.

The barrel 3 is in the first embodiment tapering, or slightly tapering, along the length L from the upper border 3-4 to the lower border 2-3. Thus, the barrel 3 has an average inner diameter, i.e. a diameter of the inner space 7, which may decrease along the barrel 3 towards the lower border 2-3. However, it is to be noted that the barrel 3 also may have a cylindrical shape, i.e. without any taper.

In the mouthpiece portion 4, above the upper border 3-4, the average inner diameter, i.e. the diameter of the inner space 7, may be larger than in the barrel 3, so that there is no full contact between the teat and the mouthpiece portion 4 below the lip 8, at least along a part of the outer surface of the teat.

The teatcup liner 1 is disclosed in a rest state in FIG. 2. The rest state may refer to a state, in which the teatcup liner 1 is mounted in the shell 5 but is not subjected to any further external forces other than from the tensioning resulting from the mounting of the teatcup liner 1 in the shell 5 of the teatcup, i.e. the teatcup liner 1 is not subjected to any milking vacuum or any pulsating vacuum, or to the forces or pressures arising when the teat is introduced into the inner space 7.

Figure 4:
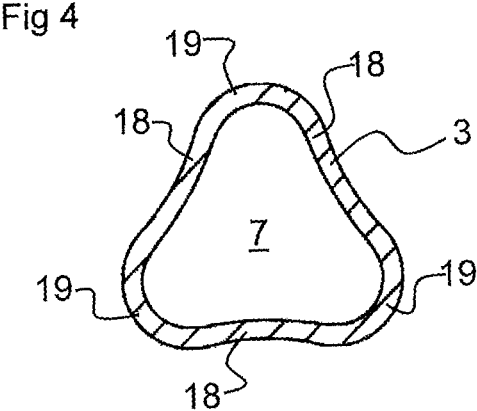
FIG. 4 discloses a sectional view of the teatcup liner along the line IV-IV in FIG. 1.
Figure 5:
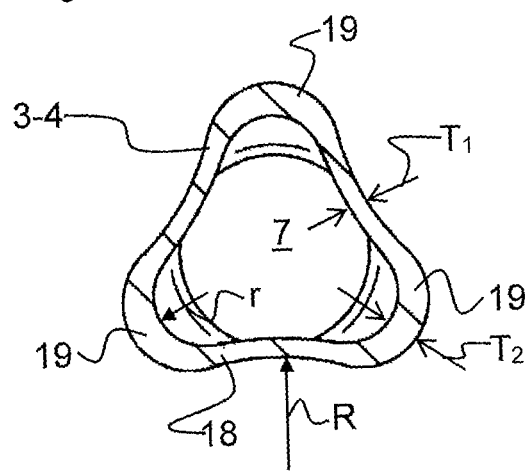
FIG. 5 discloses a sectional view of the teatcup liner along the line V-V in FIG. 1.

As can be seen in FIGS. 3, 4 and 5, the barrel 3 has, in the rest state, a polygonal cross-sectional shape with three corners, or a triangular, or an approximately triangular, cross-sectional shape, seen transversely to the longitudinal axis x, preferably along the whole, or substantially the whole, length L from the mouthpiece portion 4 to the outlet portion 2. The triangular cross-sectional shape defines three side portions 18 and three corner portions 19. Each of the side portions 18 connects two of the corner portions 19.

Each of the corner portions 19 comprises an inner surface facing the inner space 7 and having a concave curvature towards the inner space 7 with an inner radius r extending from the inner space 7 to the inner surface. The inner radius r of the corner portions 19 is relatively long, especially in comparison with the inner radius r of the corner portion 19 of a perfectly triangular shape. The inner radius r may be equal for each corner portion 19.

At the upper border 3-4 of the upper section 3, i.e. the border between the upper section 3" and the mouthpiece portion 4, see FIG. 5, the inner radius r of each corner portion 19 is relatively long at a longitudinal centre line of the corner portions 19, especially at least 4 mm. The teat may thus fill up the inner space 7 of the barrel 3 at least at the upper border 3-4 of the upper section 3.

Each of the side portions 18 has in the rest state a convex curvature towards the inner space 7 and the longitudinal central axis x, preferably along the whole length L of the barrel 3. Each of the side portions 18 thus comprises an outer surface and an opposite inner surface facing the inner space 7 and having a convex curvature towards the inner space 7. A radius R extends from a position outside the inner space 7 to the outer surface at a longitudinal centre line of the side portion 18, see FIGS. 3 and 5. The radius R may be equal for each side portion 18.

The radius R of each of the side portions 18 is larger than, or significantly larger than, the inner radius r of the corner portions 19.

The radius R of each of the side portions 18 is in the rest state at least 15 mm and at the most 40 mm at the longitudinal centre line of the respective side portion 18, see FIGS. 3 and 5, or possibly at the whole side portions 18.

Each of the side portions 18 has a side wall thickness $T_1$ at, or at least at, the longitudinal centre line of the side portion 18 along the length L of the barrel 3. Each of the corner portions 19 has a corner wall thickness $T_2$ at, or at least at, the longitudinal centre line of the corner portion 19 along the length L of the barrel 3.

The corner wall thickness $T_2$ is thicker than the side wall thickness $T_1$ along the length L of the barrel 3, i.e. along the upper section 3" and the lower section 3'.

The corner wall thickness $T_2$ decreases in a peripheral direction to the side wall thickness $T_1$ to form a continuous transition between the corner portions 19 and the adjacent side portions 18.

The corner wall thickness $T_2$ decreases along the upper section 3" of the barrel 3 towards the lower section 3' form the upper border 3-4 to the transition 6. The corner wall thickness $T_2$ may be 3.2-3.6 mm, preferably 3.3-3.5 mm, or for instance 3.4 mm or substantially 3.4 mm at the upper border 3-4. The corner wall thickness $T_2$ may decrease smoothly or continuously along the upper section 3″ of the barrel 3 from the upper border 3-4 to the transition 6.

The corner wall thickness $T_2$ approaches the side wall thickness $T_1$ along the upper section 3″ of the barrel 3 but remain thicker than the side wall thickness $T_1$.

The corner wall thickness $T_2$ is constant along the lower section 3' of the barrel 3. The corner wall thickness $T_2$ may be 1.9-2.3 mm, preferably 2.0-2.2 mm, or for instance 2.1 mm or substantially 2.1 mm at the transition 6 and along the lower section 3'.

Furthermore, the side wall thickness $T_1$ is constant along the upper section 3″ and the lower section 3' of the barrel 3. The side wall thickness $T_1$ may be 1.7-2.1 mm, preferably 1.8-2.0 mm, or for instance 1.9 mm or substantially 1.9 mm along the lower section 3' and the upper section 3″.

Figure 6:
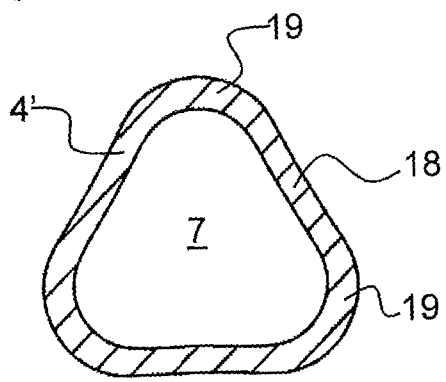
FIG. 6 discloses a sectional view of the teatcup liner along the line VI-VI in FIG. 1.
Figure 7:
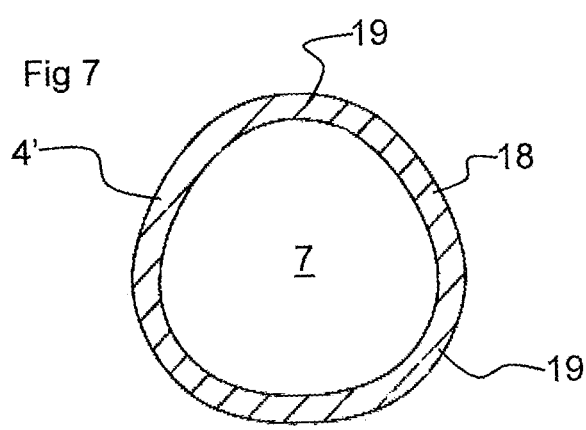
FIG. 7 discloses a sectional view of the teatcup liner along the line VII-VII in FIG. 1.

As can be seen in FIGS. 6 and 7, the transition section 4' of the mouthpiece portion 4 also have a polygonal cross-sectional shape with side portions 18 and corner portions 19. However, the polygonal cross-sectional shape of the transition section 4' continuously transmits to a circular cross-sectional shape above the transition section 4'.

Figure 8:
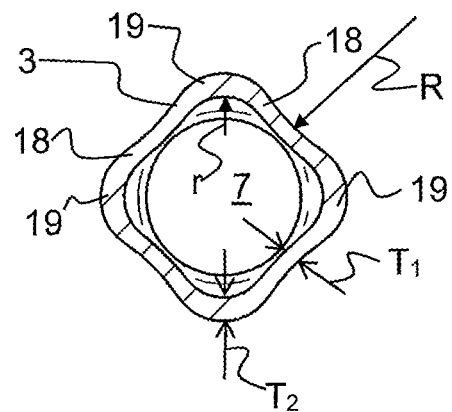
FIG. 8 discloses a sectional view corresponding to the one of FIG. 5 and referring to a second embodiment of the teatcup liner.

FIG. 8 discloses a second embodiment which differs from the first embodiment only in that the polygonal cross-sectional shape is a rectangular or square cross-sectional shape defining four side portions 18 and four corner portions 19. It should be noted, that further embodiments are possible, according to which the polygonal cross-sectional shape may define more than four side and corner portions are possible, for instance five or six side and corner portions.

Figure 9:
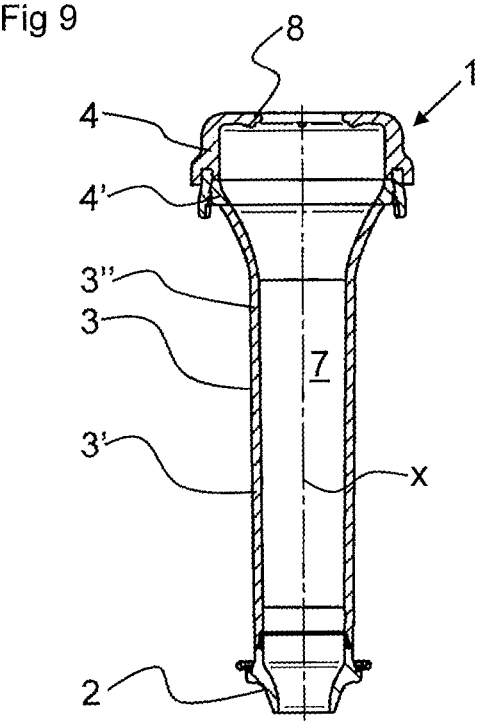
FIG. 9 discloses a sectional view corresponding toe the one in FIG. 2 and referring to third embodiment of the teatcup liner.

FIG. 9 discloses a third embodiment which differs from the first and second embodiments in that mouthpiece portion 4 is a separate part attachable to the barrel 3 to form the teatcup liner 1, and in that the outlet portion 2 is shorter, i.e. the short milk conduit is replaced by an outlet member 25, such as a nipple or the like, configured to be attached to a separate milk conduit or short milk conduit. The barrel 3 may have the same polygonal cross-sectional shape as in the first and second embodiments.

The invention is not limited to the embodiments disclosed but may be varied and modified within the scope of the following claims.

The invention claimed is:

1. A teatcup liner configured to be mounted in a shell of a teatcup to be attached to a teat of an animal to be milked, the teatcup liner comprising:
   an elongated shape extending along a longitudinal central axis,
   a barrel having a length along the longitudinal central axis and enclosing an inner space for receiving the teat,
   wherein the barrel comprises a lower section and an upper section along the longitudinal central axis, the lower section adjoining the upper section,
   wherein the barrel, in a rest state, has a polygonal cross-sectional shape transversely to the longitudinal central axis, the polygonal cross-sectional shape defining a plurality of side portions and a plurality of corner portions, each corner portion connecting two of said side portions,
   wherein each of the side portions has a side wall thickness at least at a longitudinal center line of the side portion along the length of the barrel,
   wherein each of the corner portions has a corner wall thickness at least at a longitudinal center line of the corner portion along the length of the barrel,
   wherein the corner wall thickness is thicker than the side wall thickness along the length of the barrel,
   wherein the corner wall thickness decreases along the upper section towards the lower section of the barrel with the corner wall thickness remaining thicker than the side wall thickness at a lower end of the upper section of the barrel.

2. The teacup liner according to claim 1, wherein the upper section of the barrel extends along at most 40% of the length of the barrel.

3. The teatcup liner according to claim 1, wherein the corner wall thickness is constant along the lower section of the barrel.

4. The teatcup liner according to claim 1, wherein the side wall thickness is constant along the upper section and the lower section of the barrel.

5. The teatcup liner according to claim 3, wherein the lower section of the barrel extends along at least 60% of the length of the barrel.

6. The teatcup liner according to claim 1, wherein each of the side portions in the rest state has a convex curvature towards the inner space and the longitudinal central axis along the length of the barrel.

7. The teatcup liner according to claim 1, wherein each of the corner portions in the rest state comprises an inner surface facing the inner space and having a concave curvature towards the inner space with an inner radius, which inner radius extends from the inner space to the inner surface and is in the rest state at least 4 mm at the longitudinal center line of the corner portion.

8. The teatcup liner according to claim 7, wherein the inner radius of each of the corner portions at the longitudinal center line decreases from the upper section towards a lower end of the teatcup liner.

9. The teatcup liner according to claim 1, wherein the length of the barrel lies in an interval 90-130 mm.

10. The teatcup liner according to claim 1, wherein the teatcup liner comprises an outlet portion adjoining the lower section of the barrel, and a mouthpiece portion comprising a lip defining a teat opening to the inner space.

11. The teatcup liner according to claim 10, wherein the outlet portion has engagement means configured for engagement with the shell.

12. The teatcup liner according to claim 1, wherein the polygonal cross-sectional shape is a triangular cross-sectional shape defining three side portions and three corner portions.

13. A teatcup configured to be attached to the teat of the animal to be milked, the teatcup comprising the shell and a teatcup liner according to claim 1.

14. The teatcup according to claim 13, wherein the outlet portion of the teatcup liner comprises an engagement part engaged with the shell.

15. The teatcup liner according to claim 1,
   wherein the side wall thickness is constant along the length of the barrel in both the upper section and the lower section of the barrel, and
   wherein the corner wall thickness is constant along the lower section of the barrel.

16. The teatcup according to claim 1, wherein the upper section of the barrel extends along at most 25% of the length of the barrel.

17. A teatcup configured to be attached to a teat of an animal to be milked, the teatcup comprising:
   a shell; and
   a teatcup liner mounted in the shell, the teatcup liner comprising:
   an elongated shape extending along a longitudinal central axis, a barrel having a length along the longitudinal central axis and enclosing an inner space for receiving the teat, and an outlet portion adjoining the lower section of the barrel, and a mouthpiece portion comprising a lip defining a teat opening to the inner space and an engagement part engaged with the shell, wherein the barrel comprises a lower section and an upper section along the longitudinal central axis, the lower section adjoining the upper section, the upper section of the barrel extending along at most 40% of the length of the barrel and the lower section of the barrel extending along at least 60% of the length of the barrel, wherein the barrel, in a rest state, has a polygonal cross-sectional shape transversely to the longitudinal central axis, the polygonal cross-sectional shape defining a plurality of side portions and a plurality of corner portions, each corner portion connecting two of said side portions, wherein each of the side portions has a side wall thickness at least at a longitudinal center line of the side portion along the length of the barrel, each of the side portions in the rest state having a convex curvature towards the inner space and the longitudinal central axis along the length of the barrel, wherein each of the corner portions has a corner wall thickness at least at a longitudinal center line of the corner portion along the length of the barrel, each of the corner portions in the rest state comprising an inner surface facing the inner space and having a concave curvature towards the inner space with an inner radius, wherein the corner wall thickness is thicker than the side wall thickness along the length of the barrel, and wherein the corner wall thickness decreases along the upper section towards the lower section of the barrel with the corner wall thickness remaining thicker than the side wall thickness at a lower end of the upper section of the barrel.

18. The teatcup according to claim 17, wherein, the corner wall thickness is constant along the lower section of the barrel, and the side wall thickness is constant along the length of the barrel in both the upper section and the lower section of the barrel.

19. The teatcup according to claim 17, wherein the upper section of the barrel extends along at most 25% of the length of the barrel.

* * * * *